(12) United States Patent
Thompson (10) Patent No.: US 10,549,808 B2
(45) Date of Patent: Feb. 4, 2020

(54) VEHICLE RAKING ASSEMBLY

(71) Applicant: Hawg Halters, Inc., Dahlonega, GA (US)

(72) Inventor: John Mark Thompson, Dahlonega, GA (US)

(73) Assignee: Hawg Halters, Inc., Dahlonega, GA (US)

( * ) Notice: Subject to any disclaimer, the term of this patent is extended or adjusted under 35 U.S.C. 154(b) by 162 days.

(21) Appl. No.: 15/699,722

(22) Filed: Sep. 8, 2017

(65) Prior Publication Data

US 2019/0077481 A1  Mar. 14, 2019

(51) Int. Cl.
| | | |
|---|---|---|
| *B62K 1/00* | (2006.01) | |
| *B62K 11/02* | (2006.01) | |
| *B62K 19/32* | (2006.01) | |
| *B62K 25/02* | (2006.01) | |
| *B62K 21/02* | (2006.01) | |
| *B62K 19/18* | (2006.01) | |

(52) U.S. Cl.
CPC .............. *B62K 11/02* (2013.01); *B62K 19/32* (2013.01); *B62K 21/02* (2013.01); *B62K 25/02* (2013.01); *B62K 19/18* (2013.01)

(58) Field of Classification Search
CPC ........ B62K 11/02; B62K 19/32; B62K 21/02; B62K 21/04; B62K 21/18; B62K 19/00
See application file for complete search history.

(56) References Cited

U.S. PATENT DOCUMENTS

| | | | | |
|---|---|---|---|---|
| 4,624,470 A * | 11/1986 | Love | ...................... | B62K 21/00 180/219 |
| 5,967,538 A * | 10/1999 | Callaluca | ............... | B62K 21/00 180/219 |
| 7,637,521 B2 * | 12/2009 | Grant | ..................... | B62K 13/00 280/276 |
| 7,938,422 B2 * | 5/2011 | Clari | ...................... | B62K 21/22 280/279 |
| 9,079,631 B1 * | 7/2015 | Costa | ..................... | B62K 21/22 |
| 2006/0060405 A1 * | 3/2006 | Pender | .................. | B62K 19/32 180/219 |
| 2008/0100028 A1 * | 5/2008 | Mrdeza | .................. | B62K 21/04 280/280 |
| 2009/0212529 A1 * | 8/2009 | Stenberg | ................ | B62K 11/04 280/287 |
| 2011/0204590 A1 * | 8/2011 | Delpit | .................... | B62K 21/04 280/276 |
| 2016/0075395 A1 * | 3/2016 | Lee | ........................ | B62K 21/22 280/278 |
| 2016/0288863 A1 * | 10/2016 | Hackl | .................... | B62K 21/22 |

* cited by examiner

*Primary Examiner* — Tony H Winner
(74) *Attorney, Agent, or Firm* — Ice Miller LLP (57) ABSTRACT

A vehicle raking assembly is provided. The assembly includes an upper member, a lower member, a frame fixation member configured to extend through a neck portion of a vehicle frame, and a central member disposed between the upper member and the lower member. The central member includes a central member aperture configured for a steering shaft to extend therethrough.

21 Claims, 9 Drawing Sheets

VEHICLE RAKING ASSEMBLY

BACKGROUND

The steering and stability characteristics of motorcycles, bicycles, and other vehicles can be varied and altered in a number of different ways. Altering the front wheel assembly rake and trail angles can change the steering and stability characteristics of a vehicle. The rake angle is defined as the angle which the steering axis of the front wheel assembly of the vehicle, e.g., a motorcycle (often called the "neck" of the motorcycle frame), has relative to an imaginary vertical axis or plane. Thus, if an imaginary vertical plane is passed through the steering head assembly of a vehicle, the rake angle is that angle formed between such plane and steering axis of the front wheel assembly. The horizontal distance of the forward wheel's axle from a pre-defined measure is generally referred to as a vehicles's trail. The trail can also be described as the distance defined by a vertical line from the axle of the front wheel to the ground and the intersection of the line extending through the steering axis and the ground.

Variations in the rake angle and trail measurement of a vehicle will provide different ride and steering characteristics. Vehicle operators, builders, and customizers often extend the rake angle to obtain a desired look and desired performance. Vehicle rake and trail angles are precise measurements that depend, in part, upon, and are impacted by, the size of the front wheel of the motorcycle. Thus, if an operator, builder, or customizer desires to change the size of the front wheel, it is often necessary or desirable also to alter the rake angle of the vehicle to achieve the desired level of performance, stability, and safety. Additional rake is often preferred in order to secure the desired clearance between the front tire and the frame of the vehicle. With or without adding rake to the vehicle, vehicle operators, builders, and customizers will often stretch the steering axis forward for desired performance and/or aesthetic reasons, including, but not limited to, securing clearance between the vehicle's steering components and other structural components, such as the vehicle's frame, gas tank, ignition switch, or other controls. Various methods may be employed to alter the rake angle and stretch the steering axis, ranging from permanently modifying the vehicle frame, to installing raked triple trees, to installing adjustable kits.

Various methods of adjusting the front assembly of a vehicle, including extending the fork angle, are disclosed in U.S. Pat. Nos. 3,866,946, 4,082,307, 5,967,538, 4,565,382, 7,111,861, and 7,438,306, each of which is incorporated herein by reference in its entirety.

Many known designs and methods of adjusting the front assembly of a vehicle involve permanently or at least partially modifying the vehicle frame or other structure, which may adversely affect resale of the vehicle or the ability to further modify the vehicle, result in unintended or unpredictable vehicle performance or characteristics, and/or jeopardize a manufacturer's willingness to honor a vehicle warranty. Although certain known designs are capable of reversibly achieving the basic objective of adjusting the front assembly of a vehicle, they do so without adequate strength, security, and rigidity fully to resist the loads encountered by a motorcycle or other vehicle. Such deficiencies result in flexure of various portions of the assembly, especially of bolted members like mating surfaces of upper and lower plates and components joining the upper and lower plates. Further, locking or fixing features to prevent rotation or other movement between components of conventional designs are too small and often inadequately fitted to provide sufficient resistance to the loads applied. The net result of the combined strength and/or rigidity deficiencies described above results in a motorcycle or other vehicle having, at a minimum, poor handling, unreliable performance, and/or safety concerns.

Therefore, there exists a need for a vehicle raking assembly that is reliably, reversibly, and accurately applied to a motorcycle or other vehicle to obtain a desired altered steering rake angle. Further, there exists a need for a vehicle raking assembly having enhanced strength and rigidity to improve the handling and/or performance of the raked motorcycle or other vehicle, while still being reversible and removable, and not permanently changing the original steering rake angle.

SUMMARY

In accordance with an embodiment of the present disclosure, a vehicle raking assembly includes an upper member, a lower member, a frame fixation member configured to extend through a neck portion of a vehicle frame, and a central member disposed between the upper member and the lower member, comprising a central member aperture configured for a steering shaft to extend therethrough, and extending at least partially around the frame fixation member.

In accordance with an embodiment of the present disclosure, a vehicle raking assembly includes an upper member, a lower member, a frame fixation member configured to extend through a neck portion of a vehicle frame, and a central member disposed between the upper member and the lower member and comprising a central member aperture configured for a steering shaft to extend therethrough, a first central member locking interface disposed between the upper member and the central member and comprising a first protrusion having a first noncircular geometry and a first depression having the first noncircular geometry to lock the upper member and the central member against relative rotation, and a second central member locking interface disposed between the lower member and the central member and comprising a second protrusion having a second noncircular geometry and a second depression having the second noncircular geometry.

BRIEF DESCRIPTION OF THE FIGURES

The embodiments described herein and other features, advantages, and disclosures contained herein, and the manner of attaining them, will be better understood from the following description in conjunction with the accompanying drawing figures, in which like reference numerals identify like elements, and wherein.

DETAILED DESCRIPTION

In the following detailed description of embodiments of the present disclosure, reference is made to the accompanying drawings that form a part hereof, and in which is shown by way of illustration, and not by way of limitation, such specific embodiments. It is to be understood that other embodiments may be utilized and that changes may be made without departing from the spirit and scope of the present disclosure.

Figure 1:
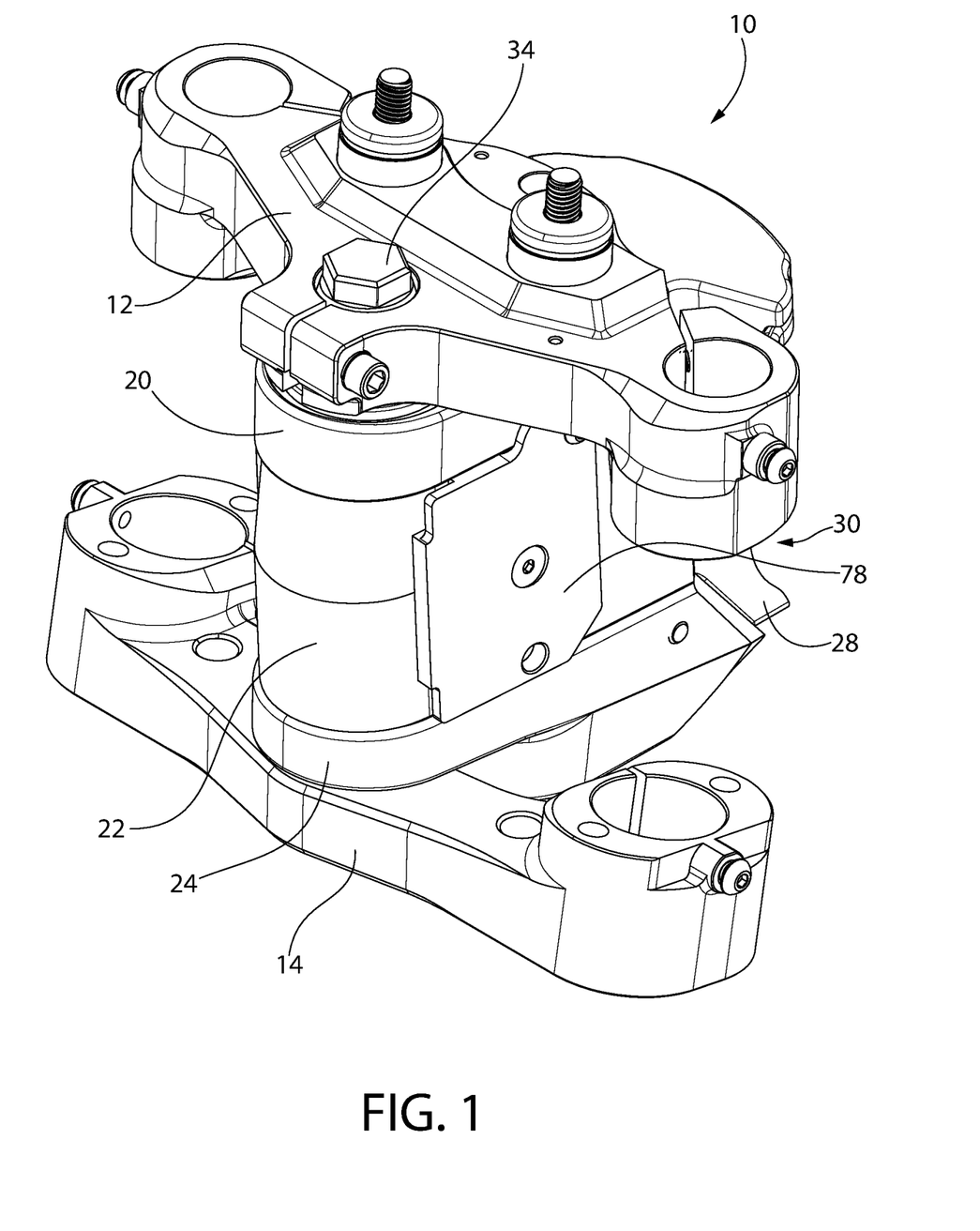
FIG. 1 is a perspective view of a vehicle raking assembly in accordance with an embodiment of the present disclosure.
Figure 2:
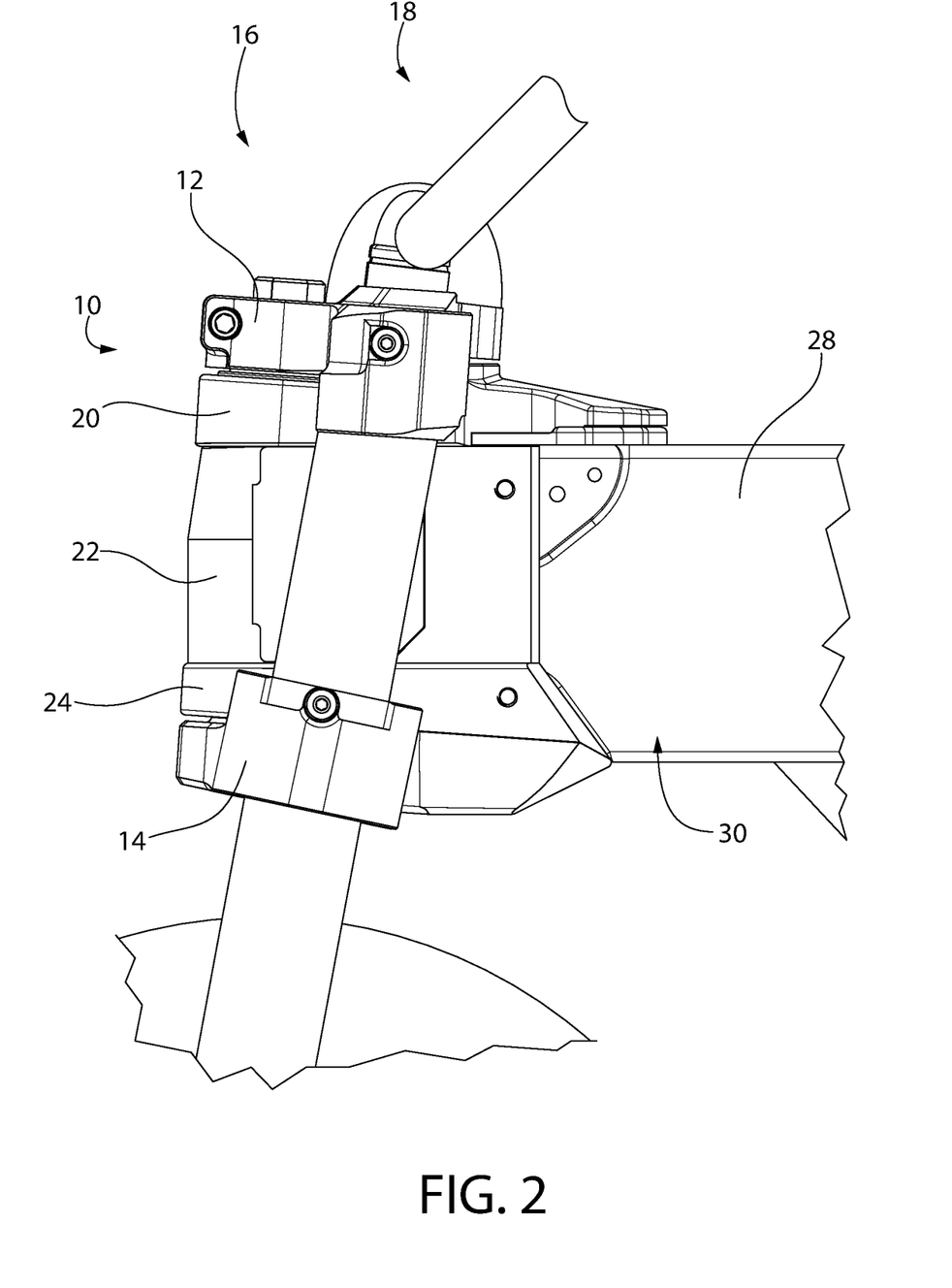
FIG. 2 is a side elevation view of a vehicle raking assembly in accordance with an embodiment of the present disclosure.

Referring now to the Figures, a vehicle raking assembly 10 is illustrated in accordance with embodiments of the present disclosure. The vehicle raking assembly 10 of the embodiment illustrated in FIGS. 1-4 includes an upper tree member 12 and a lower tree member 14. As illustrated in FIG. 2, the assembly 10 forms part of a front end assembly 16 of a vehicle 18. The vehicle 18 includes a vehicle frame 28 having a neck portion 30.

Figure 3:
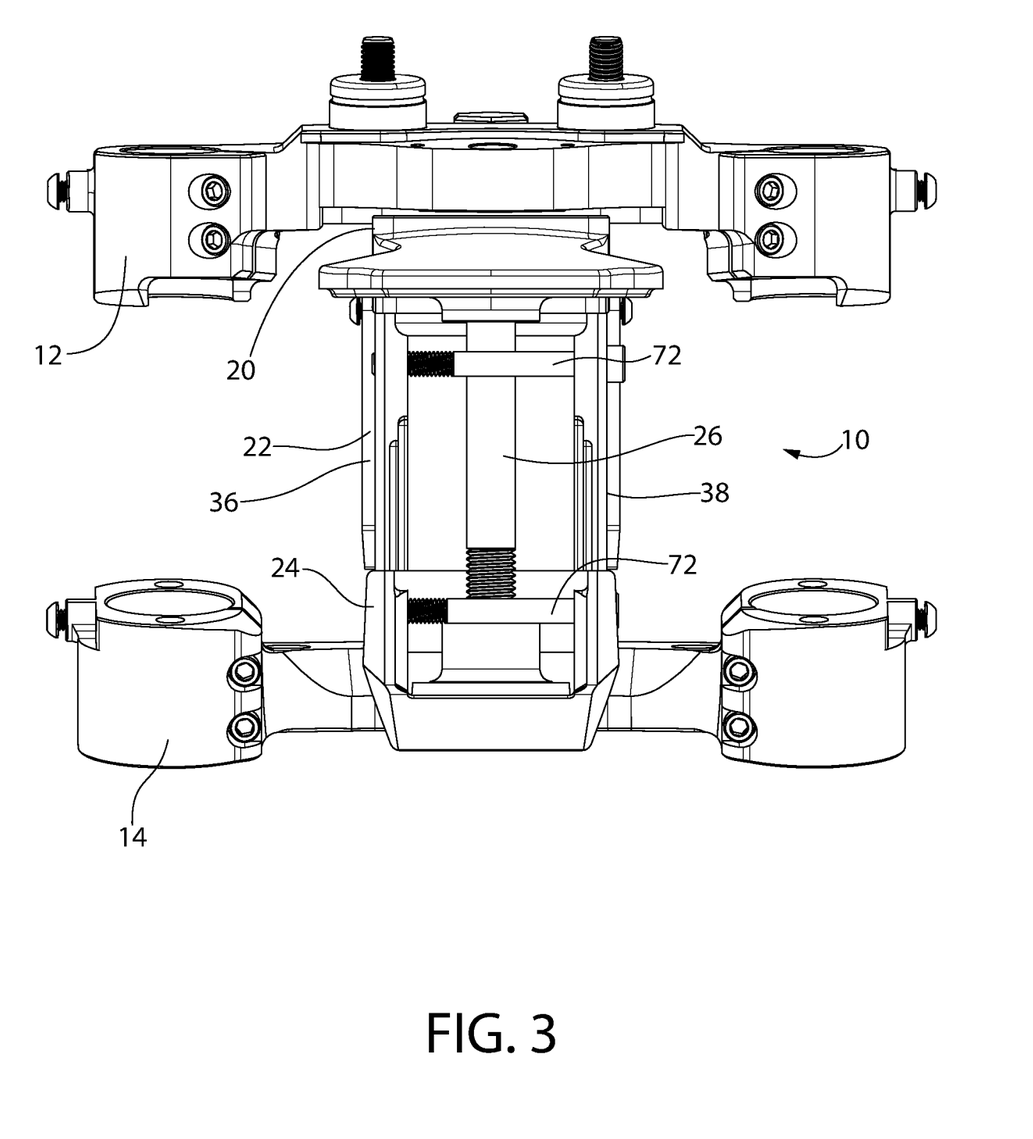
FIG. 3 is a rear elevation view of a vehicle raking assembly in accordance with an embodiment of the present disclosure.
Figure 4:
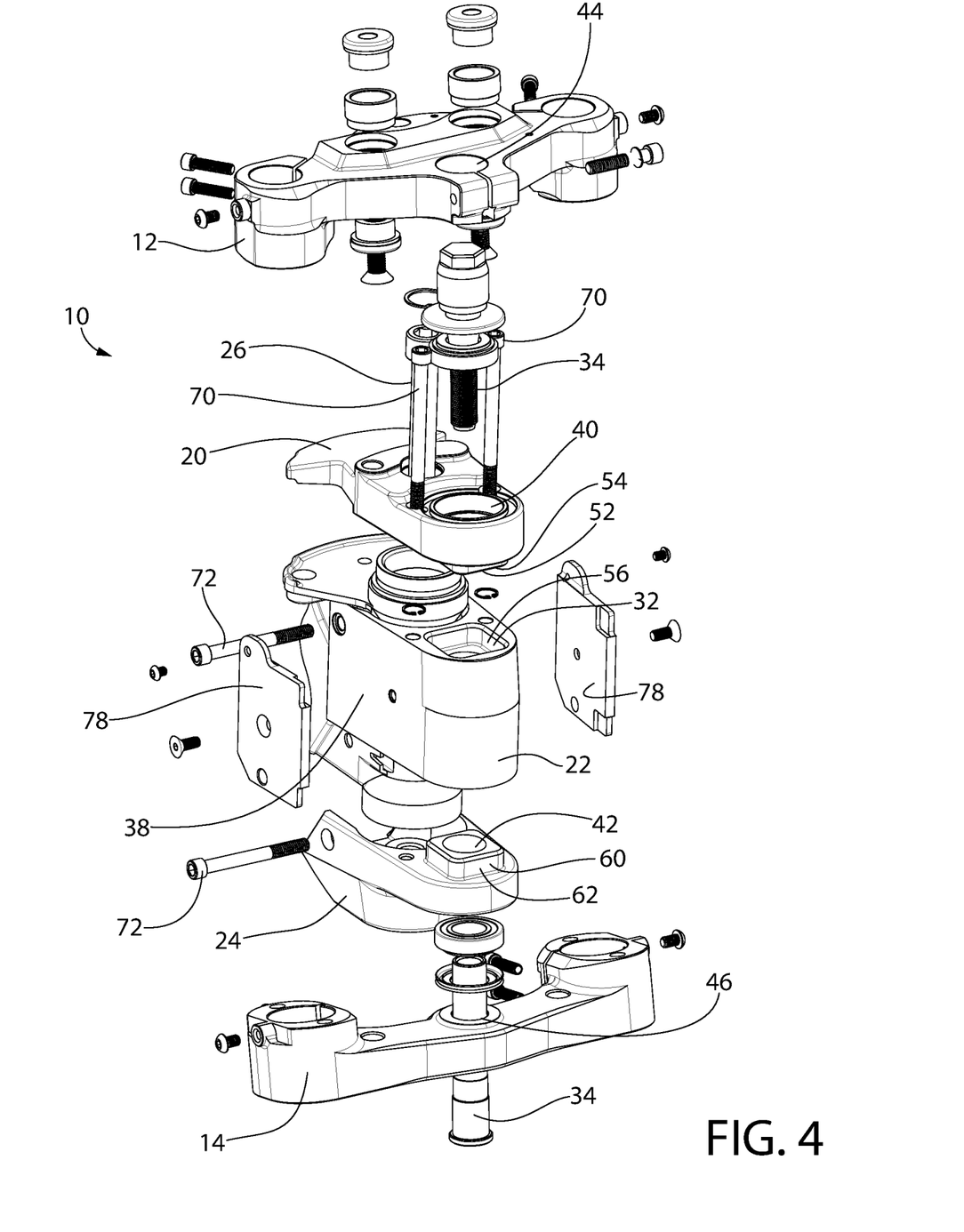
FIG. 4 is an exploded view of a vehicle raking assembly in accordance with an embodiment of the present disclosure.

Referring now to FIGS. 3 and 4, the assembly 10 includes an upper member 20, a central member 22, and a lower member 24. In the embodiment illustrated, the central member 22 is positioned between the upper member 20 and the lower member 24. A frame fixation member 26 extends through the neck portion 30 of the vehicle frame 28, shown in FIG. 2, between the upper member 20 and the lower member 24. The frame fixation member 26 includes a bolt or other fastener rigidly and/or non-rotatably fixed to the upper member 20 and the lower member 24.

As shown in FIG. 4, the central member 22 includes a central member aperture 32 configured for a steering shaft assembly 34 to extend therethrough. The steering shaft assembly 34 forms a steering shaft about which the central member 22, the upper member 20, and the lower member 24 rotate or pivot. The upper member 20 includes an upper member aperture 40 aligned with the central member aperture 32 and configured for the steering shaft assembly 34 to extend therethrough. The lower member 24 includes a lower member aperture 42 aligned with the central member aperture 32 and the upper member aperture 40 and configured for the steering shaft assembly 34 to extend therethrough. The upper tree member 12 is disposed above the upper member 20 and includes an upper tree member aperture 44. The upper tree member aperture 44 is aligned with the central member aperture 32, the upper member aperture 40, and the lower member aperture 42 and configured for the steering shaft assembly 34 to extend therethrough. The lower tree member 14 is disposed below the lower member 24 and includes a lower tree member aperture 46. The lower tree member aperture 46 is aligned with the central member aperture 32, the upper member aperture 40, the lower member aperture 42, and the upper tree member aperture 44 and configured for the steering shaft assembly 34 to extend therethrough.

Figure 5:
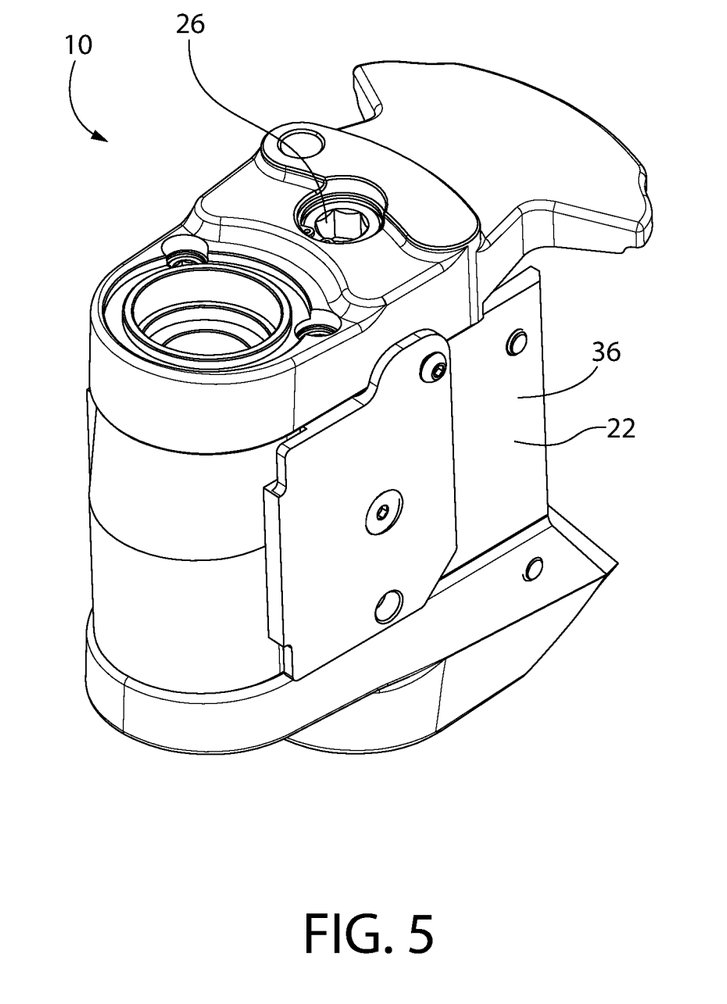
FIG. 5 is a perspective view of a vehicle raking assembly in accordance with an embodiment of the present disclosure.
Figure 6:
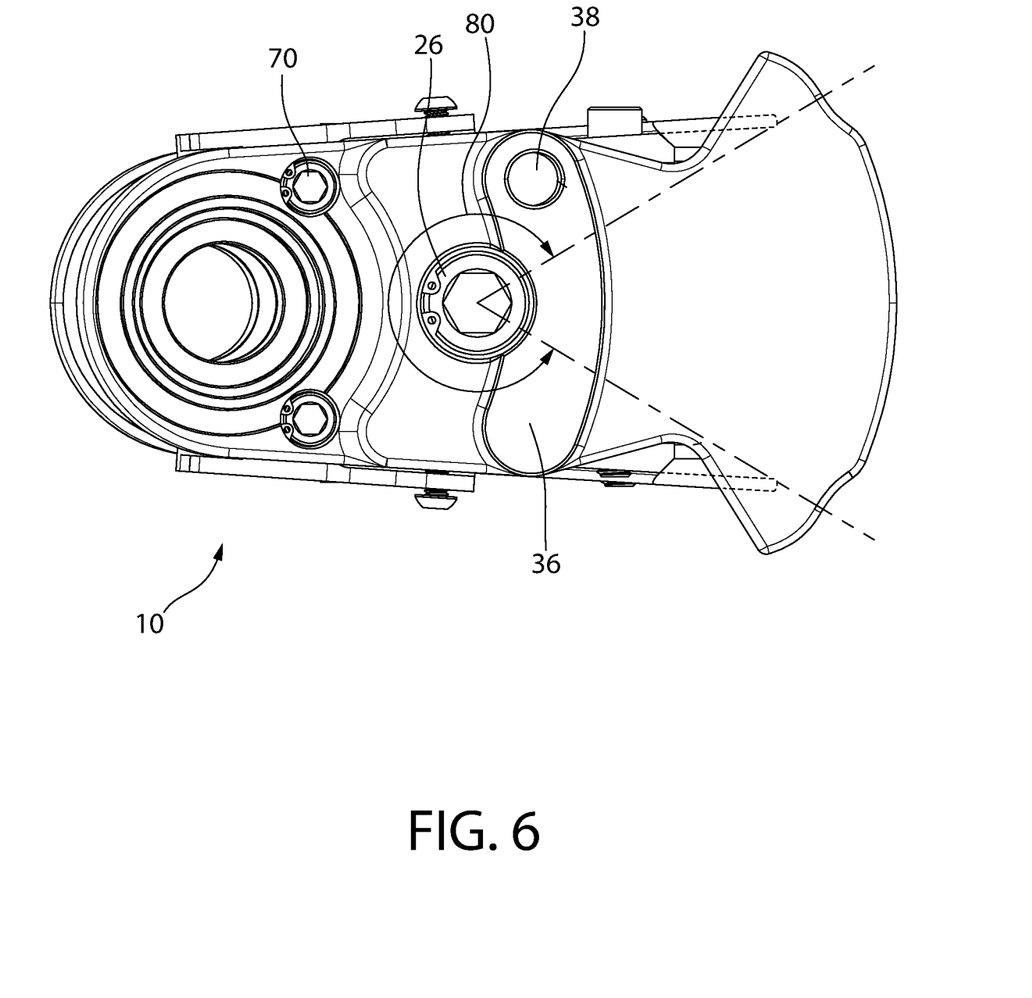
FIG. 6 is a top plan view of a vehicle raking assembly in accordance with an embodiment of the present disclosure.

Referring now to FIGS. 5 and 6, with continuing reference to FIG. 3, the central member 22 extends at least partially around the frame fixation member 26 and/or the neck portion 30. The central member 22 includes a first side wall 36 and a second side wall 38 extending at least partially around the frame fixation member 26 to form a surround angle 80. The first side wall 36 and the second side wall 38 each terminate at a straight edge, or an at least partially straight edge, extending from the upper member 20 to the lower member 24 in the illustrated embodiment. The surround angle 80 is at least 180° such that the central member 22 extends at least 180° around the frame fixation member 26 in an embodiment. In another embodiment, the central member 22 extends at least 225° around the frame fixation member 26. In another embodiment, the central member 22 extends at least 250° around the frame fixation member 26. In the illustrated embodiment, the central member 22 extends approximately 270° around the frame fixation member 26.

The assembly 10 further includes one or more assembly fastener(s) 70 extending through the central member 22 and coupling the upper member 20 to the lower member 24. The assembly 10 further includes one or more frame fastener(s) 72 extending through one or more of the upper member 20, the lower member 24, and the central member 22. The frame fastener(s) 72 are configured to couple the upper member 20, the lower member 24, and/or the central member 22 to the neck portion 30 of the vehicle frame 28. In one embodiment, the frame fastener(s) 72 pass thru one or more neck portion side plates 78 to further strengthen the resulting assembly 10 and/or to conceal certain portion of the vehicle and/or its components.

Figure 7:
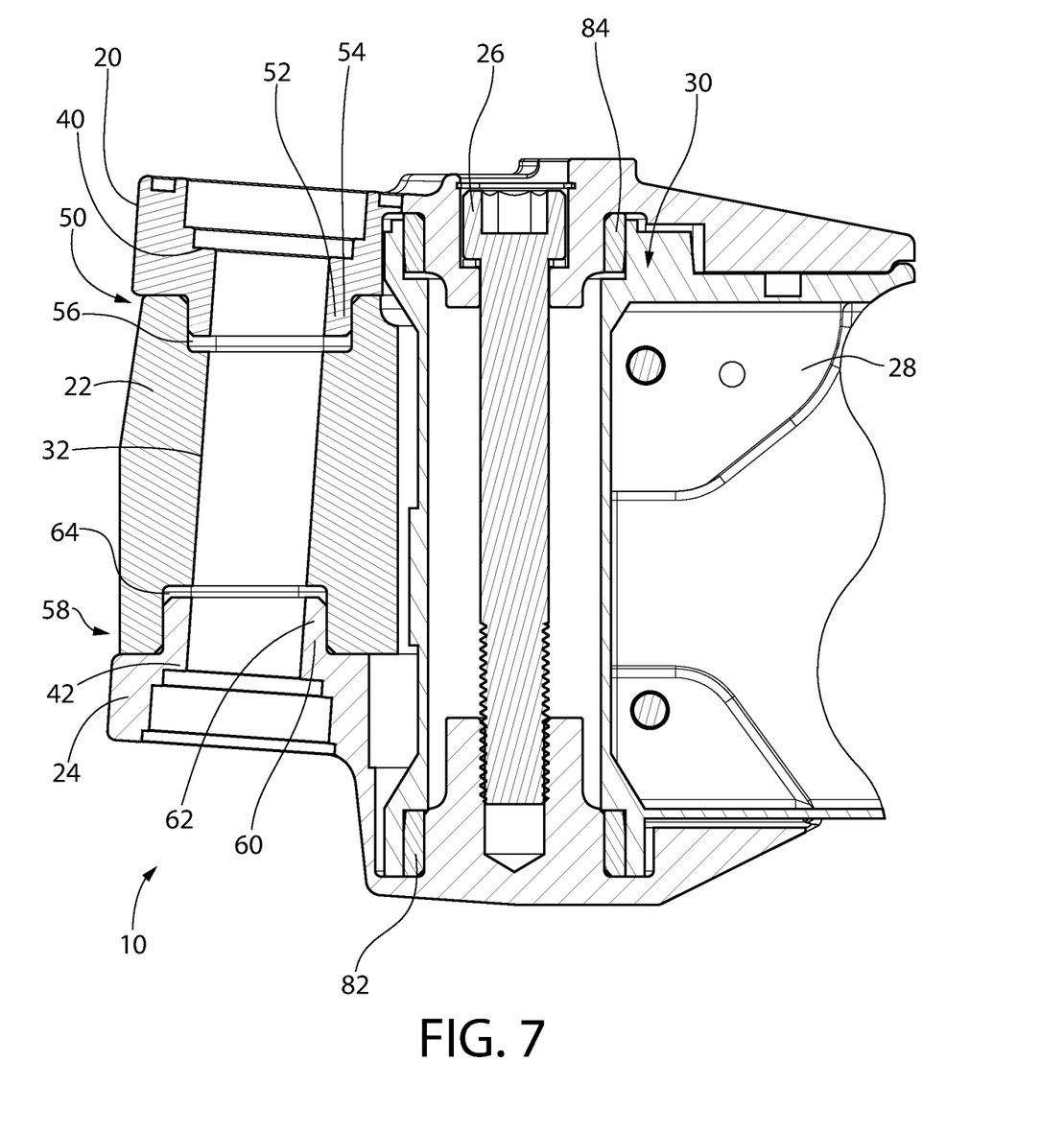
FIG. 7 is a cross-sectional view of a vehicle raking assembly in accordance with an embodiment of the present disclosure.
Figure 8:
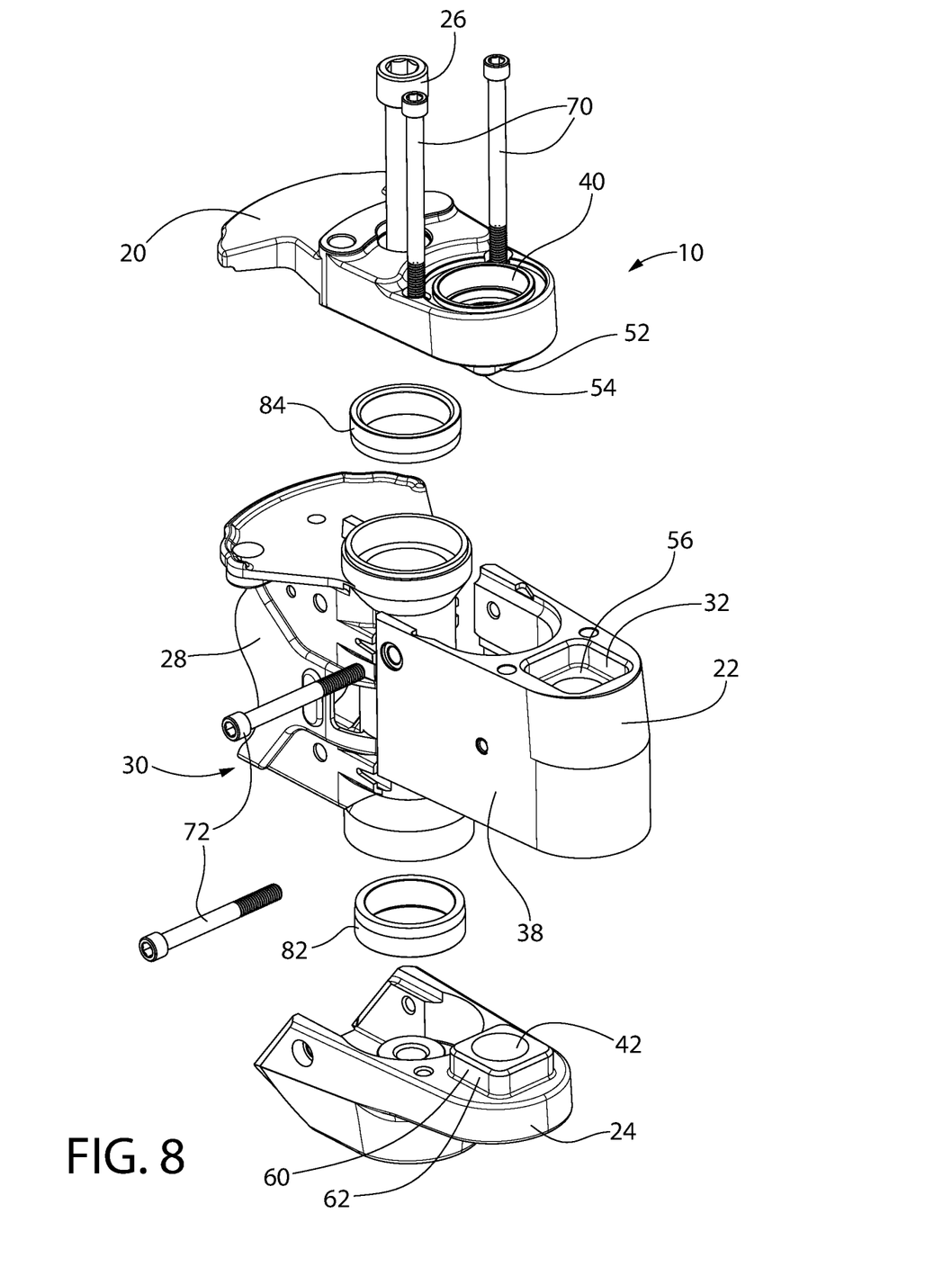
FIG. 8 is an exploded view of a vehicle raking assembly in accordance with an embodiment of the present disclosure.
Figure 9:
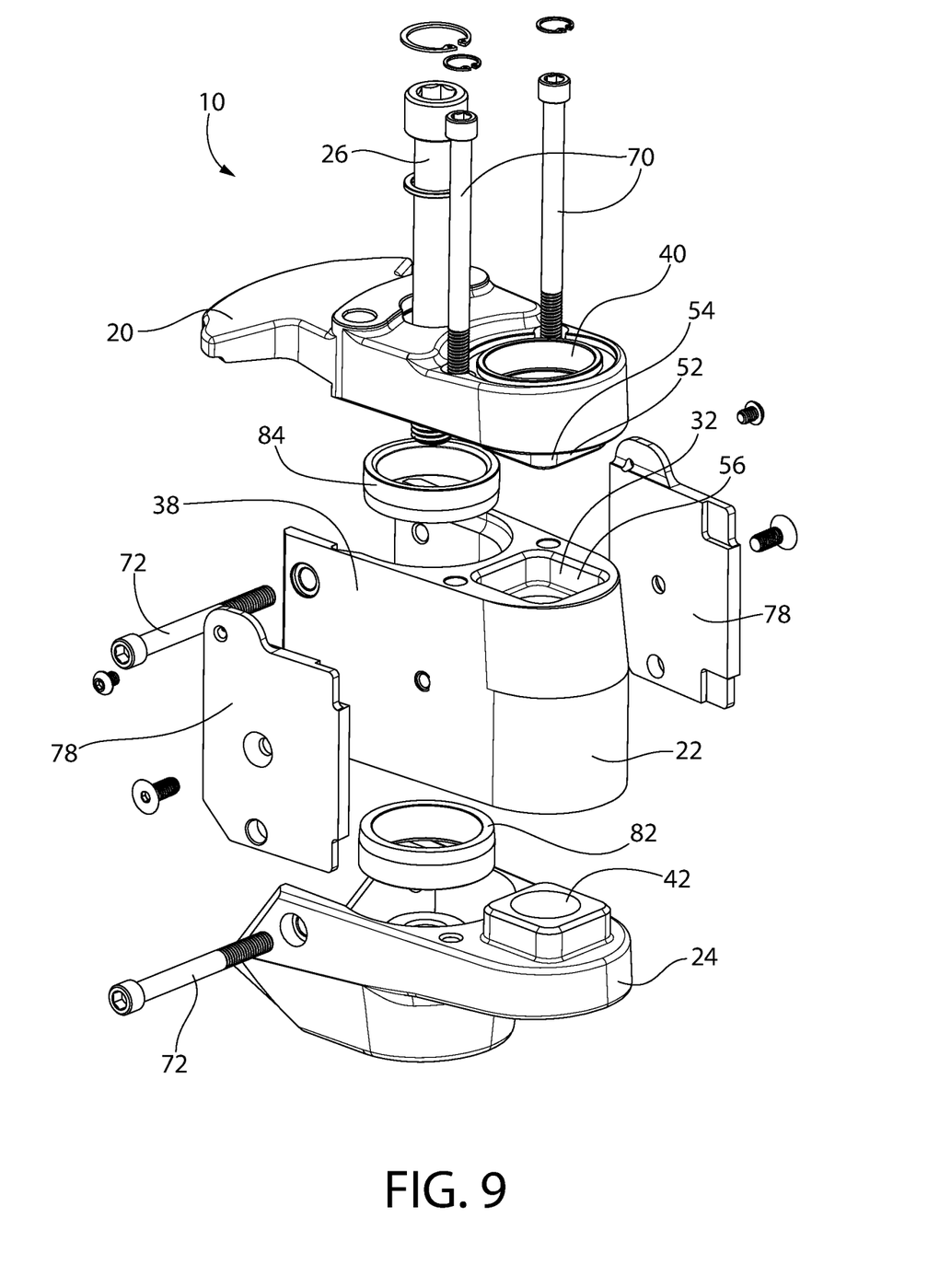
FIG. 9 is an exploded view of a vehicle raking assembly in accordance with an embodiment of the present disclosure.

Referring now to FIGS. 7-9, in an embodiment, the assembly 10 includes a first central member locking interface 50 (FIG. 7) disposed between the upper member 20 and the central member 22. The first central member locking interface 50 includes a first protrusion 52 having a first noncircular geometry 54 and a first depression 56 having the same first noncircular geometry 54 to lock the upper member 20 and the central member 22 against relative rotation. The assembly 10 further includes a second central member locking interface 58 (FIG. 7) disposed between the lower member 24 and the central member 22. The second central member locking interface 58 includes a second protrusion 60 having a second noncircular geometry 62 and a second depression 64 having the same second noncircular geometry 62. In the illustrated embodiment, the first noncircular geometry 54 is the same as the second noncircular geometry 62. In additional embodiments not illustrated, the first noncircular geometry 54 is different from the second noncircular geometry 62. In the illustrated embodiment, the first noncircular geometry 54 and the second noncircular geometry 62 include a generally square geometry. The central member aperture 32, the first central member locking interface 50, and the second central member locking interface 58 are aligned and configured for the steering shaft assembly 34 to extend therethrough.

As best shown in FIG. 7, the frame fixation member 26 of an embodiment is coupled to the lower member 24 at a lower ring 82 positioned between the lower member 24 and the neck portion 30. The frame fixation member 26 is passed through an upper ring 84 that is positioned between the upper member 20 and the neck portion 30. In an embodiment, the lower ring 82 and the upper ring 84 are press fit into the neck portion 30. The upper ring 84, the lower ring 82, the frame fixation member 26, the upper member 20, and the lower member 24 cooperate to securely mate with and/or around the geometry of the neck portion 30 to provide strong, rigid, releasable, and secure attachment of the assembly 10 to the vehicle frame 28.

The assembly 10 in accordance with one or more embodiments described herein increases the strength and rigidity, thereby improving handling and reliability, by providing the central member 22 having a relatively large surface configured to handle relatively high load. The central member 22, being a single, continuous support surface for the upper and lower members 20, 24, significantly improves the structural rigidity of the assembly 10. Further, the central member 22 mates with the upper and lower members 20, 24 via the first central member locking interface 50 and the second central member locking interface 58, which each include relatively large, generally square protrusions 52, 60 and depressions 56, 64 in the illustrated embodiments. The generally square protrusions 52, 60 and depressions 56, 64 in the illustrated embodiments each include four sides, a first side and second side being parallel and a third and a fourth side being parallel. The illustrated protrusions 52, 60 and depressions 56, 64 engage each other to rigidly fix the central member 22 and upper and lower members 20, 24, thereby providing maximum resistance to mechanical deflections. In the illustrated embodiments, the central member 22 and upper and lower members 20, 24 are all secured in compression by the frame fixation member 26 and two assembly fasteners 70 extending through the central member 22 and coupling the upper member 20 to the lower member 24, thereby forming a triangulated bolt pattern to improve strength and resistance to any twisting moments.

It will be appreciated that the resulting assembly 10 provides a strong, rigid, yet releasable assembly configured to withstand loads and forces from multiple directions and angles. The assembly 10 in accordance with the embodiments described herein provides greatly improved structural rigidity of the front end assembly 16 such that the assembly 10 acts as a vehicle frame extension comparable in strength and rigidity to a welded extension. The assembly 10 of the disclosed embodiments provides the desired vehicle frame geometry while providing excellent ride quality and handling characteristics. Further, the assembly 10 allows for adjustment of the fork rake associated with the vehicle 18 with a removable apparatus and method for easy, reliable, accurate, and permanent or temporary application to a vehicle to obtain a desired altered rake angle.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

I claim:

1. A vehicle raking assembly comprising:
   an upper member;
   a lower member;
   a frame fixation member configured to extend through a neck portion of a vehicle frame; and
   a central member disposed between the upper member and the lower member, comprising a central member aperture configured for a steering shaft to extend therethrough, and extending at least partially around the frame fixation member; wherein the central member further comprises a first side wall and a second side wall that cooperate to extend at least partially around the frame fixation member.

2. The assembly of claim 1, wherein the frame fixation member extends between the upper member and the lower member.

3. The assembly of claim 1, wherein the central member extends at least 180° around the frame fixation member.

4. The assembly of claim 1, wherein the upper member includes an upper member aperture aligned with the central member aperture and configured for a steering shaft to extend therethrough.

5. The assembly of claim 4, wherein the lower member includes a lower member aperture aligned with the central member aperture and the upper member aperture and configured for a steering shaft to extend therethrough.

6. The assembly of claim 5, further comprising an upper tree member disposed above the upper member and comprising an upper tree member aperture aligned with the upper member aperture, the central member aperture, and the lower member aperture and configured for a steering shaft to extend therethrough.

7. The assembly of claim 6, further comprising a lower tree member disposed below the lower member and comprising a lower tree member aperture aligned with the upper member aperture, central member aperture, the lower member aperture, and the upper tree member aperture and configured for a steering shaft to extend therethrough.

8. A vehicle raking assembly comprising:
   an upper member;
   a lower member;
   a frame fixation member configured to extend through a neck portion of a vehicle frame; and
   a central member disposed between the upper member and the lower member and comprising a central member aperture configured for a steering shaft to extend therethrough;
   a first central member locking interface disposed between the upper member and the central member and comprising a first protrusion having a first noncircular geometry and a first depression having the first noncircular geometry to lock the upper member and the central member against relative rotation; and
   a second central member locking interface disposed between the lower member and the central member and comprising a second protrusion having a second noncircular geometry and a second depression having the second noncircular geometry.

9. The assembly of claim 8, wherein the frame fixation member extends between the upper member and the lower member.

10. The assembly of claim 9, wherein the central member extends at least partially around the frame fixation member.

11. The assembly of claim 10, wherein the central member further comprises a first side wall and a second side wall extending at least partially around the frame fixation member.

12. The assembly of claim 8, wherein the first noncircular geometry and the second noncircular geometry comprise a geometry comprising four sides, a first side and a second side being parallel and a third side and a fourth side being parallel.

13. The assembly of claim 8, wherein the central member aperture, the first central member locking interface, and the second central member locking interface are aligned and configured for the steering shaft to extend therethrough.

14. The assembly of claim 13, wherein the upper member includes an upper member aperture aligned with the central member aperture, the first central member locking interface, and the second central member locking interface and configured for the steering shaft to extend therethrough.

15. The assembly of claim 14, wherein the lower member includes a lower member aperture aligned with the central member aperture, the upper member aperture, the first central member locking interface, and the second central member locking interface and configured for the steering shaft to extend therethrough.

16. The assembly of claim 15, further comprising an upper tree member disposed above the upper member and comprising an upper tree member aperture aligned with the central member aperture, the lower member aperture, the upper member aperture, the first central member locking interface, and the second central member locking interface and configured for the steering shaft to extend therethrough.

17. The assembly of claim 16, further comprising a lower tree member disposed below the lower member and comprising a lower tree member aperture aligned with the central member aperture, the lower member aperture, the upper member aperture, the first central member locking interface, the second central member locking interface, and the upper tree member aperture and configured for the steering shaft to extend therethrough.

18. A vehicle raking assembly comprising:
an upper member;
a lower member;
a frame fixation member configured to extend through a neck portion of a vehicle frame;
a central member disposed between the upper member and the lower member, comprising a central member aperture configured for a steering shaft to extend therethrough, and extending at least partially around the frame fixation member; and
at least one assembly fastener extending through the central member and coupling the upper member to the lower member.

19. The assembly of claim 18, wherein the frame fixation member extends between the upper member and the lower member.

20. A vehicle raking assembly comprising:
an upper member;
a lower member;
a frame fixation member configured to extend through a neck portion of a vehicle frame;
a central member disposed between the upper member and the lower member, comprising a central member aperture configured for a steering shaft to extend therethrough, and extending at least partially around the frame fixation member; and
at least one frame fastener extending through at least one of the upper member, the lower member, and the central member and configured to couple the at least one of the upper member, the lower member, and the central member to the neck portion of the vehicle frame.

21. The assembly of claim 20, wherein the frame fixation member extends between the upper member and the lower member.

* * * * *